(12) United States Patent
Sasase

(10) Patent No.: US 9,292,231 B2
(45) Date of Patent: Mar. 22, 2016

(54) IMAGE FORMING APPARATUS, IMAGE FORMING SYSTEM, AND RECORDING MEDIUM

(71) Applicant: Konica Minolta, Inc., Chiyoda-ku (JP)

(72) Inventor: Naoko Sasase, Itami (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/910,170

(22) Filed: Jun. 5, 2013

(65) Prior Publication Data

US 2014/0153039 A1   Jun. 5, 2014

(30) Foreign Application Priority Data

Jun. 19, 2012 (JP) ................................. 2012-137715

(51) Int. Cl.
  *G06F 3/12* (2006.01)
  *G06K 15/00* (2006.01)
  (Continued)

(52) U.S. Cl.
  CPC ............ *G06F 3/1203* (2013.01); *G06F 3/1226* (2013.01); *G06F 3/1231* (2013.01); *G06F 3/1292* (2013.01); *H04N 1/00307* (2013.01); *H04N 1/32117* (2013.01); *H04N 2201/0094* (2013.01); *H04N 2201/3253* (2013.01); *H04N 2201/3278* (2013.01)

(58) Field of Classification Search
  CPC .... G06Q 10/02; G06Q 10/025; G06Q 1/0968
  USPC ............... 324/714; 358/1.15; 455/11.1, 456.1
  See application file for complete search history.

(56) References Cited

U.S. PATENT DOCUMENTS 6,469,527 B1 * 10/2002 Gardner ............... G01R 35/005
  324/601
6,757,518 B2 * 6/2004 Spratt .................... G01S 5/0072
  370/390

(Continued)

FOREIGN PATENT DOCUMENTS

JP     2003-102052 A   4/2003
JP     2007-24620 A    2/2007

(Continued)

OTHER PUBLICATIONS

Office Action (Notice of Reasons for Refusal) issued on Aug. 12, 2014, by the Japanese Patent Office in corresponding Japanese Patent Application No. 2012-137715, and an English Translation of the Office Action. (8 pages).

(Continued)

Primary Examiner — Akwasi M Sarpong
(74) Attorney, Agent, or Firm — Buchanan Ingersoll & Rooney PC

(57) ABSTRACT

An image forming system comprises an external terminal and an image forming apparatus. The external terminal has a position information detection part for detecting terminal position information which is position information of the external terminal and a transmitting part capable of transmitting the terminal position information. The image forming apparatus has a communication part for receiving the terminal position information which is position information of the external terminal from the external terminal and an acquisition part for acquiring apparatus position information which is position information of the image forming apparatus on the basis of the terminal position information.

17 Claims, 13 Drawing Sheets

(51) Int. Cl.
*G06K 15/12* (2006.01)
*H04N 1/40* (2006.01)
*H04N 1/407* (2006.01)
*B41C 1/00* (2006.01)
*H04N 1/00* (2006.01)
*H04N 1/32* (2006.01)

(56) References Cited

U.S. PATENT DOCUMENTS

| | | | | |
|---|---|---|---|---|
| 8,150,291 | B2* | 4/2012 | Kouno | G03G 15/5004 399/24 |
| 8,195,201 | B2* | 6/2012 | Mukai | H04W 64/00 455/456.2 |
| 8,406,785 | B2* | 3/2013 | Alizadeh-Shabdiz | G01S 5/02 342/450 |
| 2001/0034624 | A1* | 10/2001 | Niwa | G06Q 10/02 705/5 |
| 2002/0161547 | A1 | 10/2002 | Fidler | |
| 2003/0011805 | A1* | 1/2003 | Yacoub | G06F 3/1204 358/1.15 |
| 2005/0237578 | A1* | 10/2005 | Ikeda | G06Q 10/087 358/302 |
| 2007/0112540 | A1 | 5/2007 | Mizuochi et al. | |
| 2008/0304101 | A1* | 12/2008 | Sasase | G06F 3/1204 358/1.15 |
| 2011/0045840 | A1* | 2/2011 | Alizadeh-Shabdiz | G01S 5/02 455/456.1 |
| 2011/0261405 | A1* | 10/2011 | Ito | G06F 1/3203 358/1.15 |
| 2012/0075651 | A1* | 3/2012 | Sasase | G06F 1/3209 358/1.13 |
| 2013/0003680 | A1 | 1/2013 | Yamamoto et al. | |

FOREIGN PATENT DOCUMENTS

| | | |
|---|---|---|
| JP | 2007-69563 A | 3/2007 |
| JP | 2011-199739 A | 10/2011 |
| JP | 2011-232819 A | 11/2011 |

OTHER PUBLICATIONS

First Notice of the Opinion Examination issued in corresponding Chinese Patent Application No. 2013102413803, dated Nov. 11, 2015, and an English Translation. (14 pages).

* cited by examiner

| LATITUDE | LONGITUDE | ALTITUDE | |
|---|---|---|---|
| LA1 | LO1 | AL1 | ⎫ PS1 |
| LA1 | LO1 | AL1 | |
| LA1 | LO1 | AL1 | ⎭ |
| LA2 | LO2 | AL2 | ⎫ PS2 |
| LA2 | LO2 | AL2 | ⎭ |
| LA3 | LO3 | AL3 | } PS3 |
| ... | ... | ... | ... |

| LATITUDE | LONGITUDE | ALTITUDE |
|---|---|---|
| LA11 | LO11 | AL11 | ⎱ PS11
| LA11 | LO11 | AL11 | ⎱ PS12
| LA12 | LO12 | AL12 | ...
| ... | ... | ... |

Fig.13

| | LATITUDE | LONGITUDE | ALTITUDE | |
|---|---|---|---|---|
| | LA21 | LO21 | AL21 | ⎫ PS21 |
| | LA21 | LO21 | AL21 | ⎬ |
| | LA22 | LO22 | AL22 | ⎫ PS22 |
| | ... | ... | ... | ... |

TB(TB3)

IMAGE FORMING APPARATUS, IMAGE FORMING SYSTEM, AND RECORDING MEDIUM

This application is based on Japanese Patent Application No. 2012-137715 filed on Jun. 19, 2012, the contents of which are hereby incorporated by reference.

BACKGROUND OF THE INVENTION

1. Field of the Invention

The present invention relates to an image forming apparatus and a technique relevant to the same.

2. Description of the Background Art

Some of image forming apparatuses are each equipped with a GPS function and thereby capable of acquiring position information indicating a set position thereof (see Japanese Patent Application Laid Open Gazette No. 2011-232819 (Patent Document 1)). Specifically, Patent Document 1 discloses an image forming apparatus which comprises a position information acquisition part for acquiring position information of the image forming apparatus by using a GPS.

By the technique disclosed in Patent Document 1, it is possible to use the position information of the image forming apparatus as appropriate. For example, it is possible to automatically specify an image forming apparatus which is closest to an external terminal among a plurality of image forming apparatuses by using respective position information of the image forming apparatuses, to thereby send a printing instruction or the like to the closest image forming apparatus.

The technique disclosed in Patent Document 1, however, is based on the premise that the position information of the image forming apparatus is acquired by using a GPS function of the image forming apparatus itself. Therefore, when an image forming apparatus has no GPS function, disadvantageously, it is difficult for the image forming apparatus to acquire position information thereof.

SUMMARY OF THE INVENTION

It is an object of the present invention to provide a technique for acquiring position information of an image forming apparatus even when the image forming apparatus has no GPS function.

The present invention is intended for an image forming system. According to a first aspect of the present invention, the image forming system comprises an external terminal and an image forming apparatus, and in the image forming system of the present invention, the external terminal has a position information detection part for detecting terminal position information which is position information of the external terminal and a transmitting part capable of transmitting the terminal position information, the image forming apparatus has a communication part for receiving the terminal position information which is position information of the external terminal from the external terminal and an acquisition part for acquiring apparatus position information which is position information of the image forming apparatus on the basis of the terminal position information, the communication part receives a plurality of terminal position information from at least one external terminal, and the acquisition part acquires an average value of a plurality of terminal positions included in the plurality of terminal position information as the apparatus position information.

The present invention is also intended for an image forming apparatus. According to a second aspect of the present invention, the image forming apparatus comprises a communication part for receiving terminal position information which is position information of an external terminal from the external terminal and an acquisition part for acquiring apparatus position information which is position information of the image forming apparatus on the basis of the terminal position information, and in the image forming apparatus of the present invention, the communication part receives a plurality of terminal position information from at least one external terminal, and the acquisition part acquires an average value of a plurality of terminal positions included in the plurality of terminal position information as the apparatus position information.

The present invention is still also intended for a non-transitory computer-readable recording medium. According to a third aspect of the present invention, the non-transitory computer-readable recording medium records therein a computer program to be executed by a computer embedded in an image forming apparatus to cause the computer to perform the steps of a) receiving terminal position information which is position information of an external terminal from the external terminal and b) acquiring apparatus position information which is position information of the image forming apparatus on the basis of the terminal position information, and in the recording medium of the present invention, a plurality of terminal position information are received from at least one external terminal in the step a), and an average value of a plurality of terminal positions included in the plurality of terminal position information as the apparatus position information in the step b).

According to a fourth aspect of the present invention, an image forming system comprises an external terminal and an image forming apparatus, and in the image forming system of the present invention, the external terminal has a position information detection part for detecting terminal position information which is position information of the external terminal and a transmitting part capable of transmitting the terminal position information, the image forming apparatus has a communication part for receiving the terminal position information which is position information of the external terminal from the external terminal and an acquisition part for acquiring apparatus position information which is position information of the image forming apparatus on the basis of the terminal position information, the terminal position information includes first terminal position information received from the external terminal by communication in accordance with a proximity communication mode in which communication can be performed only when a transmitting unit and a receiving unit are in a proximity state, and the acquisition part acquires the first terminal position information itself as the apparatus position information.

According to a fifth aspect of the present invention, an image forming apparatus comprises a communication part for receiving terminal position information which is position information of an external terminal from the external terminal and an acquisition part for acquiring apparatus position information which is position information of the image forming apparatus on the basis of the terminal position information, and in the image forming apparatus of the present invention, the terminal position information includes first terminal position information received from the external terminal by communication in accordance with a proximity communication mode in which communication can be performed only when a transmitting unit and a receiving unit are in a proximity state, and the acquisition part acquires the first terminal position information itself as the apparatus position information.

According to a sixth aspect of the present invention, a non-transitory computer-readable recording medium records therein a computer program to be executed by a computer embedded in an image forming apparatus to cause the computer to perform the steps of a) receiving terminal position information which is position information of an external terminal from the external terminal; and b) acquiring apparatus position information which is position information of the image forming apparatus on the basis of the terminal position information, and in the recording medium of the present invention, the terminal position information includes first terminal position information received from the external terminal by communication in accordance with a proximity communication mode in which communication can be performed only when a transmitting unit and a receiving unit are in a proximity state, and the first terminal position information itself is acquired as the apparatus position information in the step b).

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a view showing a terminal position information table;

FIG. 10 is a view showing a terminal position information table;

FIG. 13 is a view showing a terminal position information table.

DESCRIPTION OF THE PREFERRED EMBODIMENTS

1. The First Preferred Embodiment

<1-1. Overall Configuration>

Figure 1:
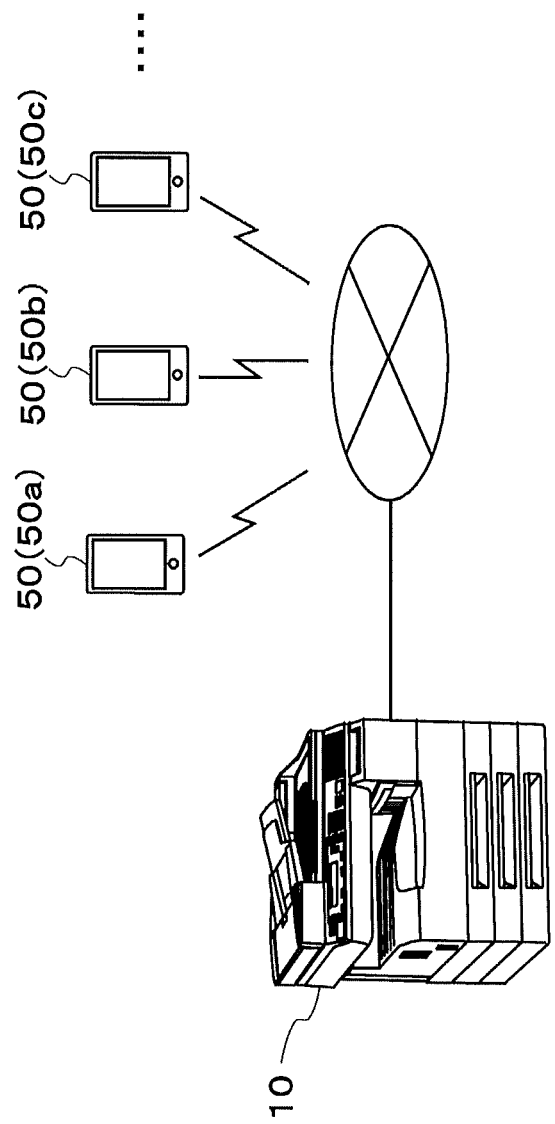
FIG. 1 is a view showing a schematic constitution of an image forming system.

FIG. 1 is a view showing an image forming system 1. As shown in FIG. 1, the image forming system 1 comprises an image forming apparatus 10 and a plurality of external terminals 50 (50a, 50b, 50c, . . . ). Between the image forming apparatus 10 and each of the external terminals 50, two-way wireless communication can be performed. Specifically, between the image forming apparatus 10 and each of the external terminals 50, data can be transmitted and received by wireless communication in accordance with various types of communication modes.

<1-2. Constitution of Image Forming Apparatus 10>

Figure 2:
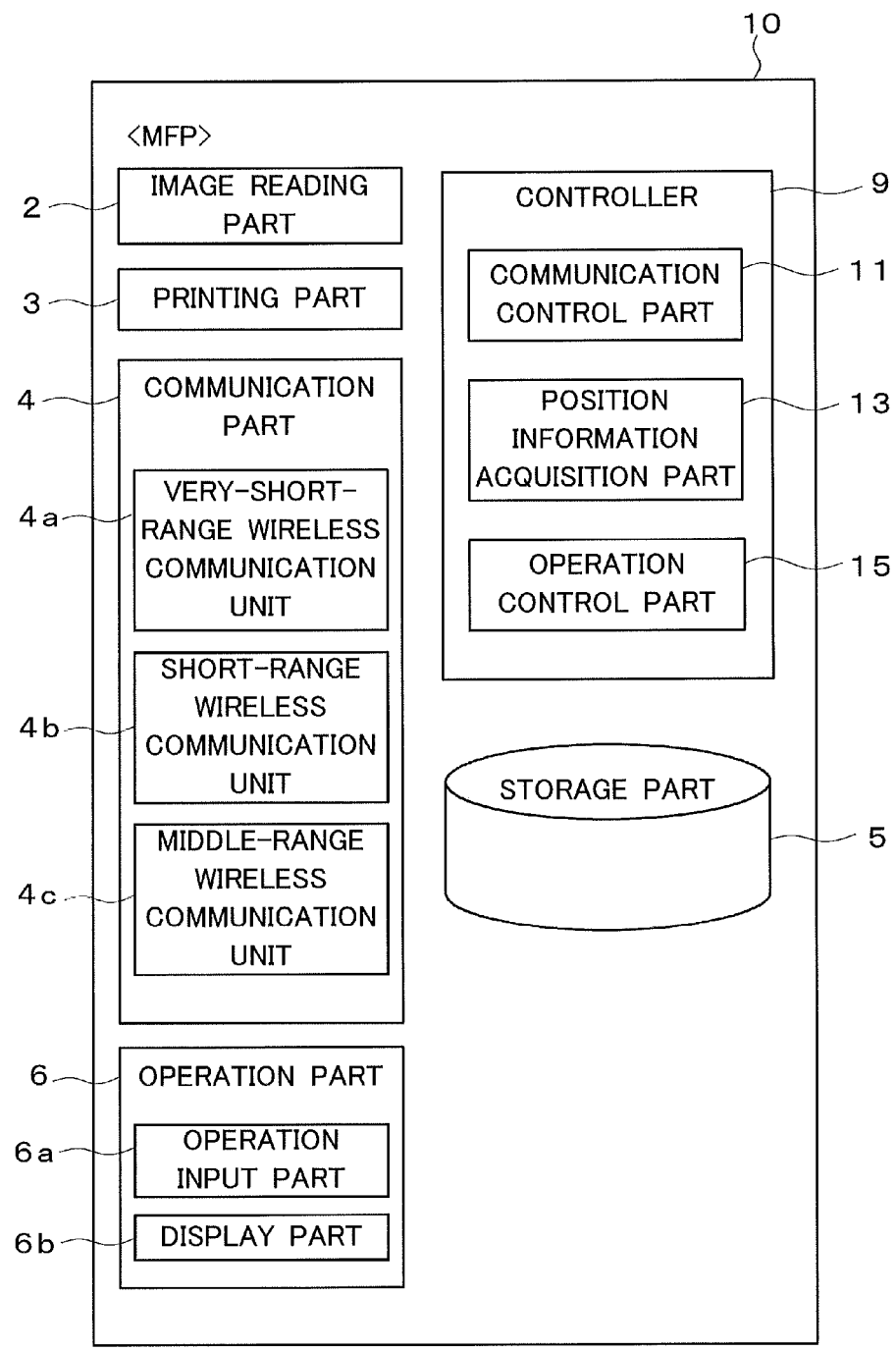
FIG. 2 is a view showing function blocks of an image forming apparatus.

FIG. 2 is a view showing function blocks of the image forming apparatus 10. Herein, as an example of the image forming apparatus 10, shown is an MFP (Multi-Functional Peripheral). FIG. 2 shows function blocks of an MFP 10.

The MFP 10 is an apparatus (also referred to as a multi-function machine) having a scanner function, a copy function, a facsimile function, a box storage function, and the like. Specifically, as shown in the functional block diagram of FIG. 2, the MFP 10 comprises an image reading part 2, a printing part 3, a communication part 4, a storage part 5, an operation part 6, a controller 9, and the like and multiply uses these constituent parts to implement various functions.

The image reading part 2 is a processing part which optically reads (in other words, scans) an original manuscript placed on a predetermined position of the MFP 10 and generates image data of the original manuscript (also referred to as an "original manuscript image" or a "scan image"). The image reading part 2 is also referred to as a scanning part.

The printing part 3 is an output part which prints out an image to various media such as paper on the basis of the data on an object to be printed.

The communication part 4 is a processing part capable of performing wireless communication in accordance with a plurality of different communication modes (in more detail, very-short-range (ultra-short-range) wireless communication VR, short-range wireless communication SR, and middle-range wireless communication MR).

Specifically, the communication part 4 comprises a very-short-range (ultra-short-range) wireless communication unit 4a, a short-range wireless communication unit 4b, and a middle-range wireless communication unit 4c.

The very-short-range wireless communication unit 4a is a communication unit used for communication in accordance with the very-short-range wireless communication VR. As the very-short-range wireless communication unit 4a, for example, used is an NFC reader capable of performing communication based on the NFC (Near Field Communication) standard.

The very-short-range wireless communication VR using the very-short-range wireless communication unit 4a is a communication mode in which communication can be performed only in a proximity range, and in more detail, is a communication mode having a maximum communication distance of about 10 cm (centimeter). In other words, the very-short-range wireless communication VR is a proximity communication mode in which communication can be performed only when a very-short-range wireless communication unit 54a (described later) of the external terminal 50 and the very-short-range wireless communication unit 4a of the MFP 10 are in a proximity state. Herein, the proximity state includes a state in which the very-short-range wireless communication unit 54a (described later) of the external terminal 50 and the very-short-range wireless communication unit 4a of the image forming apparatus 10 are in contact with each other and a state in which the very-short-range wireless communication unit 54a and the very-short-range wireless communication unit 4a are away from each other by a very short distance (about 10 cm at most).

The short-range wireless communication unit 4b is a communication unit used for communication in accordance with the short-range wireless communication SR. As the short-range wireless communication unit 4b, for example, used is a communication module capable of performing communication based on the Bluetooth (registered trademark) standard.

The short-range wireless communication SR using the short-range wireless communication unit 4b is a communication mode in which communication can be performed even in a state (hereinafter, referred to also as a non-proximity state) other than the proximity state, and in more detail, is a communication mode having a maximum communication distance of about 20 m (meter). In other words, the short-range wireless communication SR is a communication mode having the maximum communication distance (about 20 m) longer than the maximum communication distance of the very-short-range wireless communication VR (about 10 cm). Specifically, the short-range wireless communication SR is a non-proximal communication mode in which communication can be performed even when a short-range wireless communication unit 54b (described later) of the external terminal 50 and the short-range wireless communication unit 4b of the MFP 10 are in a non-proximity state. Therefore, in the short-range wireless communication SR, communication can be performed even in a state where the short-range wireless communication unit 54b (described later) of the external terminal 50 and the short-range wireless communication unit 4b of the MFP 10 are away from each other by a distance of about 20 m (meter) at most.

The middle-range wireless communication unit 4c is a communication unit used for communication in accordance with the middle-range wireless communication MR. As the middle-range wireless communication unit 4c, for example, used is a wireless LAN module.

The middle-range wireless communication MR using the middle-range wireless communication unit 4c is a communication mode having a maximum communication distance of about 100 m (meter). In other words, the middle-range wireless communication MR is a communication mode having the maximum communication distance (about 100 m) longer than the maximum communication distance of the short-range wireless communication SR (about 20 m). Specifically, the middle-range wireless communication MR is a non-proximal communication mode in which communication can be performed even when a middle-range wireless communication unit 54c (described later) of the external terminal 50 and the middle-range wireless communication unit 4c of the MFP 10 are in a non-proximity state. Therefore, in the middle-range wireless communication MR, communication can be performed even in a state where the middle-range wireless communication unit 54c (described later) of the external terminal 50 and the middle-range wireless communication unit 4c of the MFP 10 are away from each other by a distance of about 100 m (meter) at most.

The communication part 4 has a transmitting part and a receiving part.

The communication part 4 (in more detail, the receiving part thereof) receives position information (hereinafter, referred to also as terminal position information) TP of the external terminal 50 by communication with the external terminal 50.

The communication part 4 (in more detail, the transmitting part thereof) sends position information (hereinafter, referred to also as apparatus position information) AP of the image forming apparatus 10 to the external terminal 50.

The storage part 5 is a storage unit such as a hard disk drive (HDD) or/and the like. The storage part 5 stores therein a terminal position information table TB (TB1) (see FIG. 4) and the like.

As shown in FIG. 4, the terminal position information table TB1 is a table recording a plurality of terminal positions (in more detail, terminal position coordinates) included in a plurality of terminal position information TP. In the terminal position information table TB, as the terminal position coordinates, recorded are coordinate values ("latitude", "longitude", "altitude", or the like)

The operation part 6 comprises an operation input part 6a for receiving an operation input which is given to the MFP 10 and a display part 6b for displaying various information thereon.

The controller 9 is a control unit for generally controlling the MFP 10. The controller 9 is a computer system which is embedded in the MFP 10 and comprises a CPU, various semiconductor memories (RAM and ROM), and the like. The controller 9 causes the CPU to execute a predetermined software program (hereinafter, referred to simply as a "program") PG1 stored in the ROM (e.g., EEPROM), to thereby implement various processing parts. Further, the program (in more detail, a group of program modules) PG1 may be acquired via various portable (in other words, non-transitory) computer-readable recording media such as a USB memory or the like or via the network NW or the like and installed into the MFP 10.

Specifically, as shown in FIG. 2, the controller 9 executes the program PG1, to thereby implement various processing parts including a communication control part 11, a position information acquisition part 13, and an operation control part 15.

The communication control part 11 is a processing part for controlling communication with other apparatus(es) (the external terminal 50 or/and the like) in cooperation with the communication part 4 and the like.

The position information acquisition part 13 is a processing part for acquiring the apparatus position information AP on the basis of a plurality of terminal positions recorded in the terminal position information table TB1 (see FIG. 4).

Specifically, the position information acquisition part 13 sets a weight for the terminal position included in the terminal position information TP in recording the terminal position information TP into the terminal position information table TB1 in cooperation with the storage part 5. Then, in response to an inquiry about the apparatus position information AP transmitted from the external terminal 50, the position information acquisition part 13 calculates a weighted average value of a plurality of terminal positions included in a plurality of terminal position information TP and acquires the weighted average value as the apparatus position information AP.

The operation control part 15 controls various operations such as a printing operation and the like of the image forming apparatus 10.

<1-3. Constitution of External Terminal 50>

Next, discussion will be made on a constitution of the external terminal 50. Herein, as an example of the external terminal 50, shown is a tablet terminal. The external terminal 50, however, is not limited to this but may be a smartphone, a personal computer, or the like.

Figure 3:
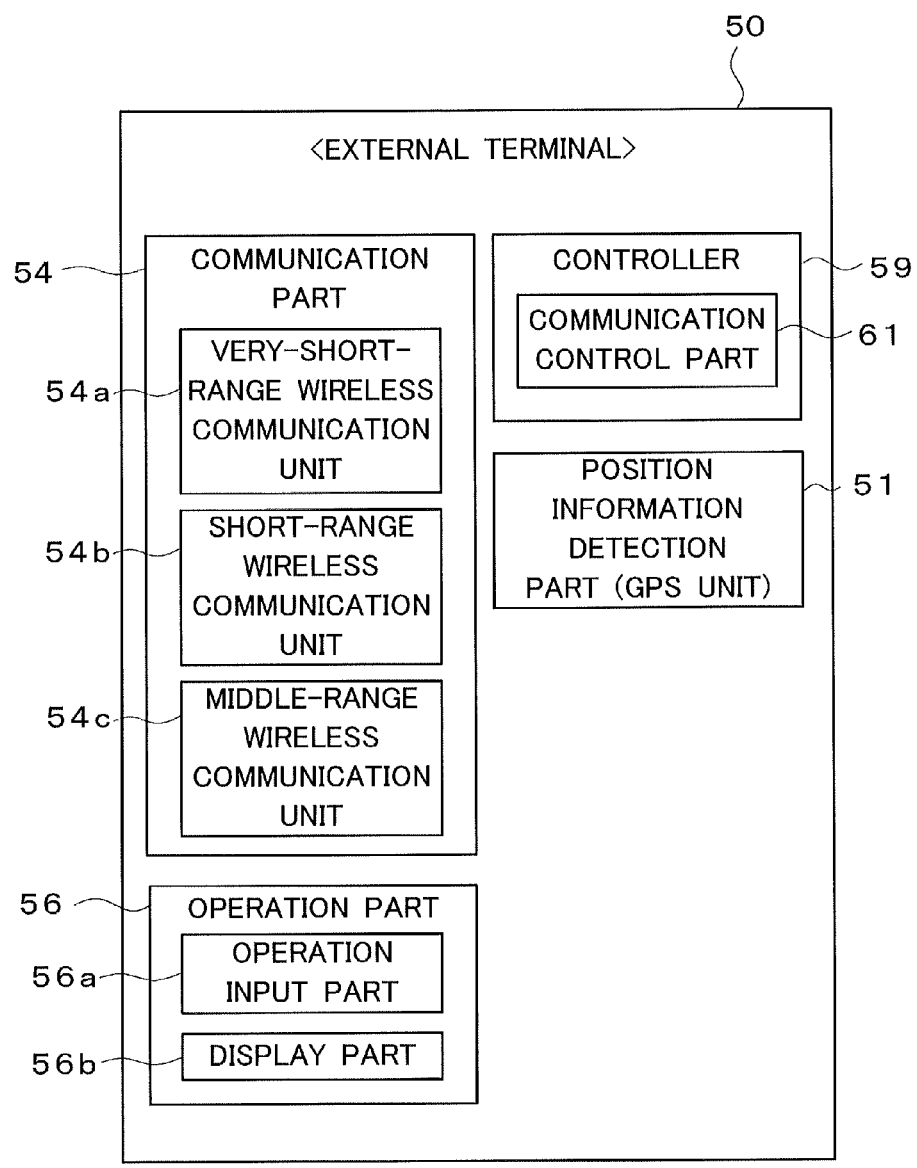
FIG. 3 is a view showing function blocks of an external terminal.

FIG. 3 is a functional block diagram showing a schematic constitution of the external terminal 50.

As shown in the functional block diagram of FIG. 3, the external terminal 50 comprises a position information detection part 51, a communication part 54, an operation part 56, a controller 59, and the like and multiply uses these constituent parts to implement various functions.

The position information detection part 51 is a processing part for detecting position information (terminal position information TP) of the external terminal 50 itself, and is also referred to as a terminal position information detection part. The position information detection part 51 comprises, for example, a GPS unit and the like.

The communication part 54 is a processing part capable of performing wireless communication in accordance with a plurality of different communication modes (in more detail, very-short-range (ultra-short-range) wireless communication VR, short-range wireless communication SR, and middle-range wireless communication MR).

The communication part 54 has a transmitting part and a receiving part. The communication part 54 comprises a very-short-range (ultra-short-range) wireless communication unit 54a, a short-range wireless communication unit 54b, and a middle-range wireless communication unit 54c.

For example, the communication part 54 (in more detail, the transmitting part thereof) sends the terminal position information TP which is position information of the external terminal 50 to the image forming apparatus 10 by communication with the image forming apparatus 10. For example, the communication part 54 sends the terminal position information TP together with various jobs (scan job, print job, or the like) to the image forming apparatus 10. Alternatively, the communication part 54 sends the terminal position information TP to the MFP 10 in order to perform an operation of authenticating the MFP 10. Thus, the communication part 54 sends the terminal position information TP when information other than the terminal position information TP is transmitted from the external terminal 50.

Further, the communication part 54 (in more detail, the transmitting part thereof) sends the inquiry about the apparatus position information AP to the image forming apparatus 10.

The operation part 56 comprises an operation input part 56a for receiving an operation input which is given to the external terminal 50 and a display part 56b for displaying various information thereon. The external terminal 50 is provided with a touch panel (touch screen) which is a liquid crystal display panel in which a piezoelectric sensor or the like is embedded. The touch panel serves as part of the operation input part 56a and also serves as part of the display part 56b.

The controller 59 is a control unit for generally controlling the external terminal 50. The controller 59 is a computer system which is embedded in the external terminal 50 and comprises a CPU, various semiconductor memories (RAM and ROM), and the like. The controller 59 causes the CPU to execute a predetermined software program (hereinafter, also referred to simply as a "program") PG2 stored in a memory part (semiconductor memory or the like), to thereby implement various processing parts. Further, the program PG2 may be acquired via various portable (in other words, non-transitory) computer-readable recording media such as a USB memory or the like or via the network NW or the like and installed into the external terminal 50.

Specifically, as shown in FIG. 3, the controller 59 executes the program PG2, to thereby implement various processing parts including a communication control part 61.

The communication control part 61 is a processing part for controlling communication with the image forming apparatus 10 and the like in cooperation with the communication part 54 and the like.

<1-4. Operation>

Figure 5:
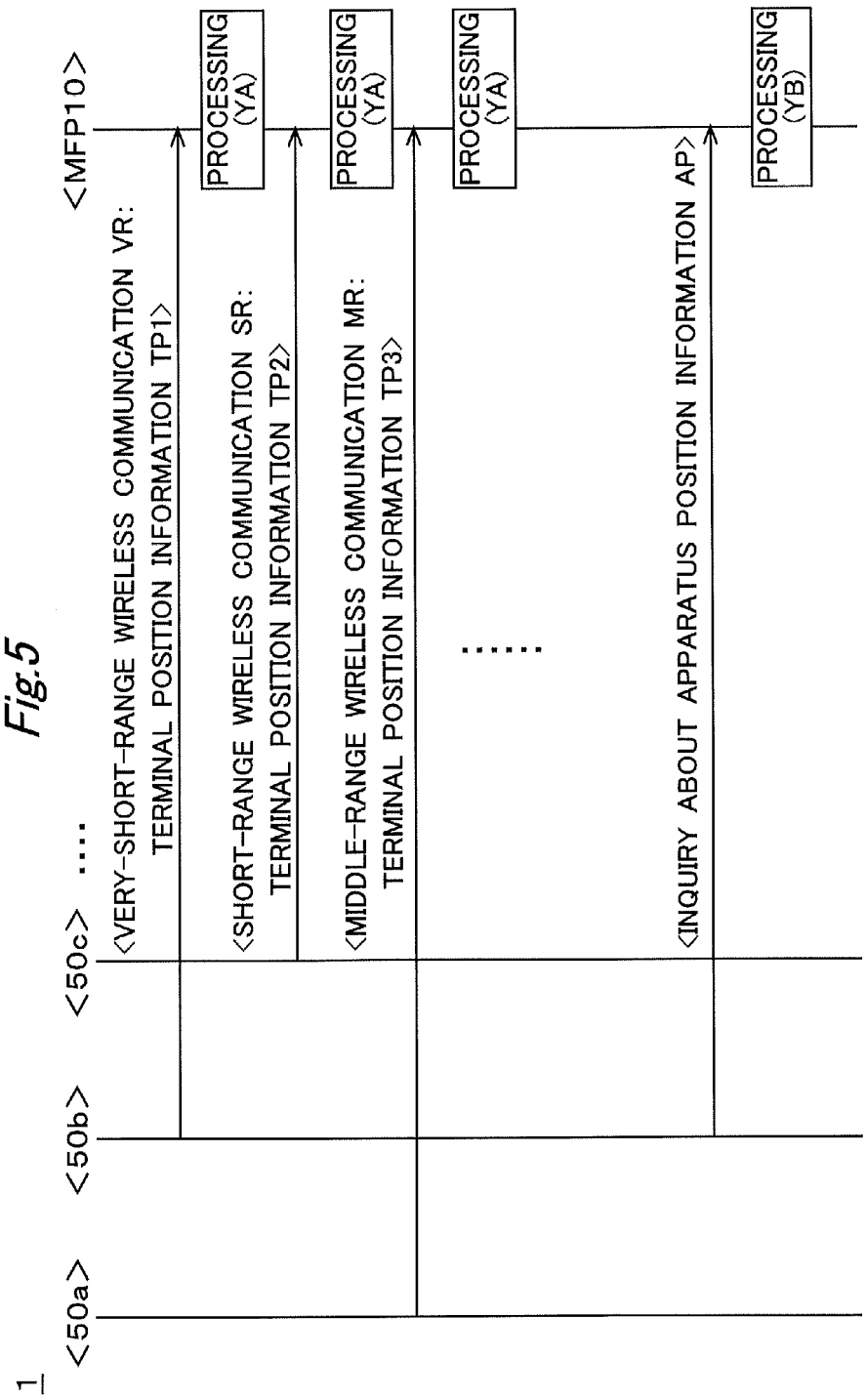
FIG. 5 is a view showing an operation of the image forming system in accordance with a first preferred embodiment of the present invention.
Figure 6:
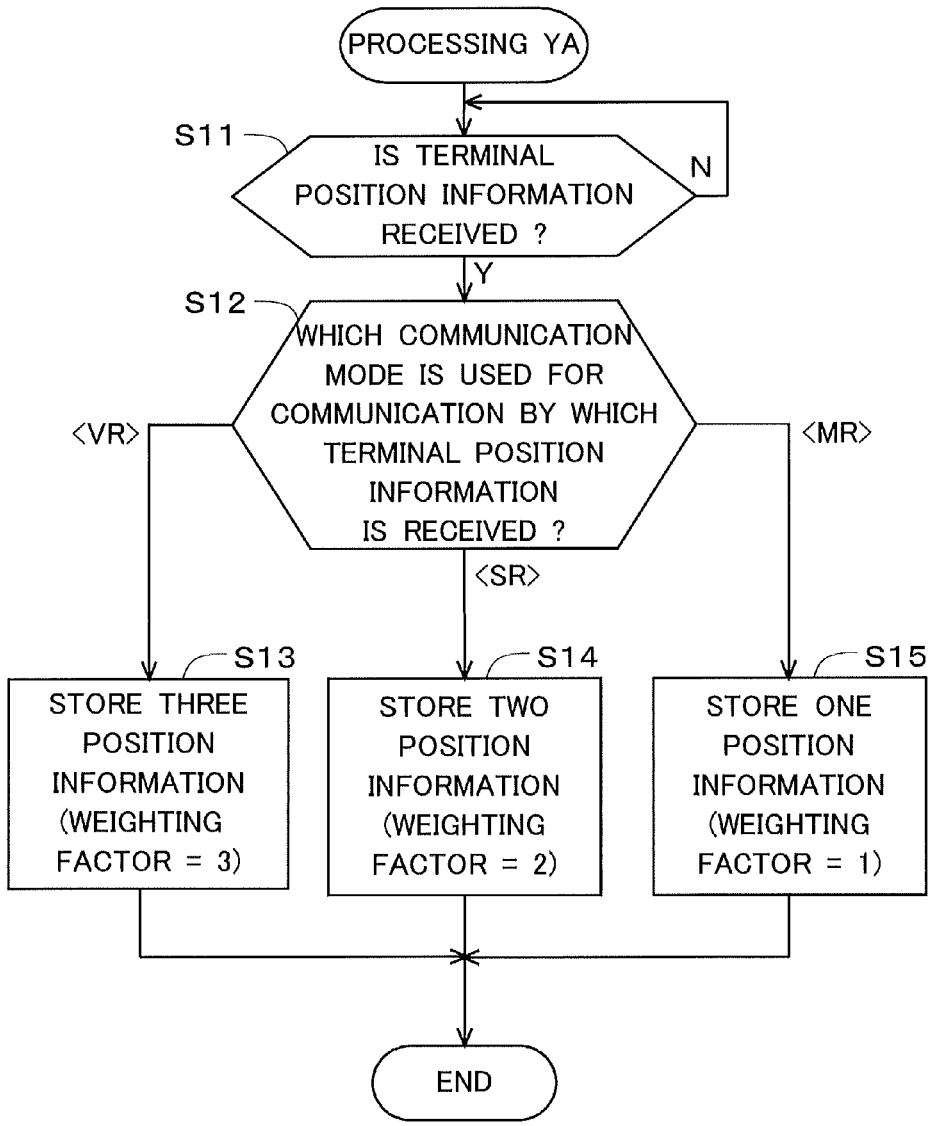
FIGS. 6 and 7 are flowcharts each showing an operation of the image forming apparatus.
Figure 7:
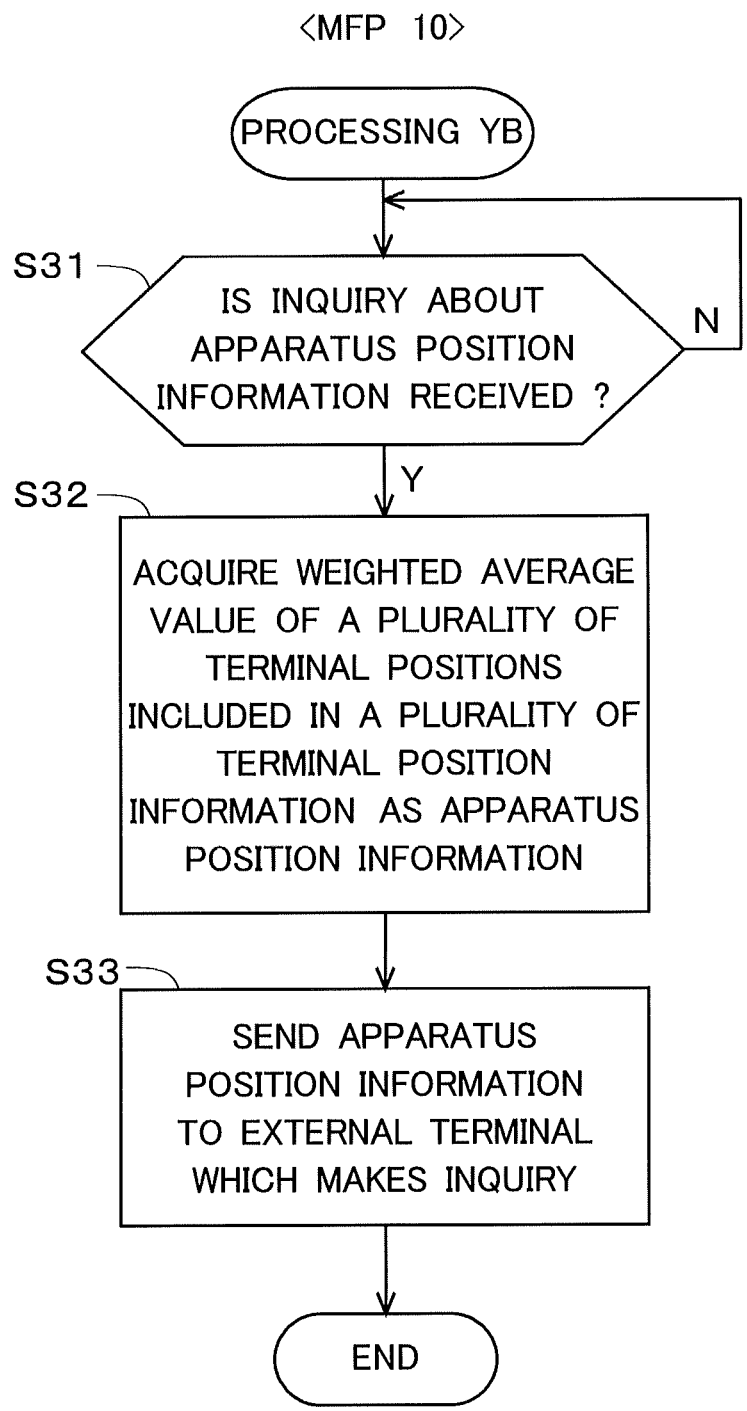

Next, with reference to FIGS. 5 to 7, discussion will be made on an operation of the image forming system 1 in accordance with the first preferred embodiment. FIG. 5 is a view showing an outline of the operation of the image forming system 1. FIGS. 6 and 7 are flowcharts each showing an operation of the MFP 10. In more detail, FIG. 6 is a flowchart showing a processing YA (discussed later) performed by the MFP 10, and FIG. 7 is a flowchart showing a processing YB (discussed later) performed by the MFP 10.

As shown in FIG. 5, when the MFP 10 receives the terminal position information TP (TP1, TP2, TP3, . . . ) from the external terminal 50, the MFP 10 performs the processing YA (discussed later) as appropriate. Further, when the MFP 10 receives the inquiry about the apparatus position information AP from the external terminal 50, the MFP 10 performs the processing YB (discussed later).

Hereinafter, with reference to the flowchart of FIG. 6, discussion will be made on the processing YA.

When the MFP 10 receives the terminal position information TP from the external terminal 50 ("Yes" in Step S11), the MFP 10 performs a branch operation discussed below (Step S12).

Specifically, the MFP 10 determines which communication mode is used for the communication by which the terminal position information TP is received from the external terminal 50, and then performs a branch operation on the basis of the determination result.

For example, when it is determined that the terminal position information TP1 is received from the external terminal 50b by communication in accordance with the very-short-range wireless communication VR (Step S12), the process goes to Step S13. Then, the image forming apparatus 10 uses the position information acquisition part 13 to record a terminal position PS1 (in more detail, coordinates of the terminal position) included in the terminal position information TP1 into the terminal position information table TB1 (see FIG. 4). Specifically, the position information acquisition part 13 records the terminal position PS1 three times (see FIG. 4) into the terminal position information table TB1 (in more detail, into lines 1 to 3 of the terminal position information table TB1) in cooperation with the storage part 5. The position information acquisition part 13 thereby indirectly sets a weighting factor of the terminal position PS1 to "3".

After that, when it is determined that the terminal position information TP2 is received from the external terminal 50c by communication in accordance with the short-range wireless communication SR (Step S12), the process goes to Step S14. Then, the image forming apparatus 10 uses the position information acquisition part 13 to record a terminal position PS2 (in more detail, coordinates of the terminal position) included in the terminal position information TP2 into the terminal position information table TB1 (see FIG. 4). Specifically, the position information acquisition part 13 records the terminal position PS2 twice (see FIG. 4) into the terminal position information table TB1 (in more detail, into lines 4 and 5 of the terminal position information table TB1) in cooperation with the storage part 5. The position information acquisition part 13 thereby indirectly sets a weighting factor of the terminal position PS2 to "2".

After that, when it is further determined that the terminal position information TP3 is received from the external terminal 50a by communication in accordance with the middle-range wireless communication MR (Step S12), the process goes to Step S15. Then, the image forming apparatus 10 uses the position information acquisition part 13 to record a terminal position PS3 (in more detail, coordinates of the terminal position) included in the terminal position information TP3 into the terminal position information table TB1 (see FIG. 4). Specifically, the position information acquisition part 13 records the terminal position PS3 once into the terminal position information table TB1 (in more detail, into line 6 of the terminal position information table TB1) in cooperation with the storage part 5. The position information acquisition part 13 thereby indirectly sets a weighting factor of the terminal position PS3 included in the terminal position information TP3 to "1".

Thus, the position information acquisition part 13 sets a different weight for the terminal position PS included in the terminal position information TP as appropriate in accordance with the communication mode used for receiving the terminal position information TP.

In more detail, the position information acquisition part 13 sets the weight of the terminal position PS1 included in the terminal position information TP1 which is received by communication in accordance with the very-short-range wireless communication VR, to be larger than that of the terminal position PS2 included in the terminal position information TP2 which is received by communication in accordance with the short-range wireless communication SR having the maximum communication distance longer than that of the very-short-range wireless communication VR.

Further, the position information acquisition part 13 sets the weight of the terminal position PS2 included in the terminal position information TP2 which is received by communication in accordance with the short-range wireless communication SR, to be larger than that of the terminal position PS3 included in the terminal position information TP3 which is received by communication in accordance with the middle-range wireless communication MR having the maximum communication distance longer than that of the short-range wireless communication SR.

Subsequently, with reference to the flowchart of FIG. 7, discussion will be made on the processing YB.

When the MFP 10 receives the inquiry about the apparatus position information AP, for example, from the external terminal 50b ("Yes" in Step S31), the MFP 10 acquires the apparatus position information AP (Step S32).

Specifically, the MFP 10 uses the position information acquisition part 13 to calculate a weighted average value of a plurality of terminal positions PS1, PS2, PS3, . . . (in more detail, respective coordinates thereof) included in a plurality of terminal position information TP1, TP2, TP3, . . . and acquire the weighted average value as the apparatus position information AP. Herein, for each of the plurality of terminal positions PS1, PS2, PS3, . . . , a weighting factor is indirectly set in accordance with the number of records into the terminal position information table TB1. Therefore, as the weighted average value of the plurality of terminal positions PS1, PS2, PS3, . . . , the position information acquisition part 13 calculates an average value (simple average value) obtained by simply summing up the plurality of terminal positions PS1, PS1, PS1, PS2, PS2, PS3, . . . (see FIG. 4) recorded in the terminal position information table TB1 and dividing the sum by the total number of records.

After that, the MFP 10 sends the apparatus position information AP acquired by the position information acquisition part 13 to the external terminal 50 (50b) which makes the inquiry (Step S33). Then, the external terminal 50 performs processing using the apparatus position information AP. For example, the external terminal 50 uses the apparatus position information AP to specify an MFP 10 which is closest to the external terminal 50 among a plurality of MFPs 10 and sends a printing instruction to the specified MFP 10.

In the above operation, the apparatus position information AP is acquired on the basis of the terminal position information TP which is received by communication with the external terminal 50. For this reason, even when the MFP 10 has no GPS function, the MFP 10 can acquire the apparatus position information AP thereof.

Further, the weighted average value of the plurality of terminal positions PS is calculated with the weight of the terminal position PS1 included in the terminal position information TP1 which is received from the external terminal 50b by communication in accordance with the very-short-range wireless communication VR set to be larger than the weight of the terminal position PS2 included in the terminal position information TP2 which is received from the external terminal 50c by communication in accordance with the short-range wireless communication SR. Since the maximum communication distance of the very-short-range wireless communication VR is shorter than that of the short-range wireless communication SR, there is a strong likelihood that the external terminal 50b which performs communication in accordance with the very-short-range wireless communication VR may be located closer to the MFP 10 than the external terminal 50c which performs communication in accordance with the short-range wireless communication SR. Therefore, it is possible to acquire more accurate apparatus position information AP as compared with a case where a simple average value of a plurality of terminal positions PS with no weight is acquired as the apparatus position information AP.

The weighted average value of the plurality of terminal positions PS is calculated with the weight of the terminal position PS2 included in the terminal position information TP2 which is received from the external terminal 50c by communication in accordance with the short-range wireless communication SR set to be larger than the weight of the terminal position PS3 included in the terminal position information TP3 which is received from the external terminal 50a by communication in accordance with the middle-range wireless communication MR. Since the maximum communication distance of the short-range wireless communication SR is shorter than that of the middle-range wireless communication MR, there is a strong likelihood that the external terminal 50c which performs communication in accordance with the short-range wireless communication SR may be located closer to the MFP 10 than the external terminal 50a which performs communication in accordance with the middle-range wireless communication MR. Therefore, it is possible to acquire more accurate apparatus position information AP as compared with a case where a simple average value of a plurality of terminal positions PS with no weight is acquired as the apparatus position information AP.

2. The Second Preferred Embodiment

The second preferred embodiment is a variation of the first preferred embodiment.

Discussion will be made below, centering on the difference between the first and second preferred embodiments.

In the first preferred embodiment, the case has been discussed where a different weight is set for the terminal position PS included in the terminal position information TP as appropriate in accordance with the communication mode used for receiving the terminal position information TP.

On the other hand, in the second preferred embodiment, a case will be discussed where a different weight is set for the terminal position included in the terminal position information TP depending on whether the terminal position information TP is received together with a scan job or a print job.

Figure 8:
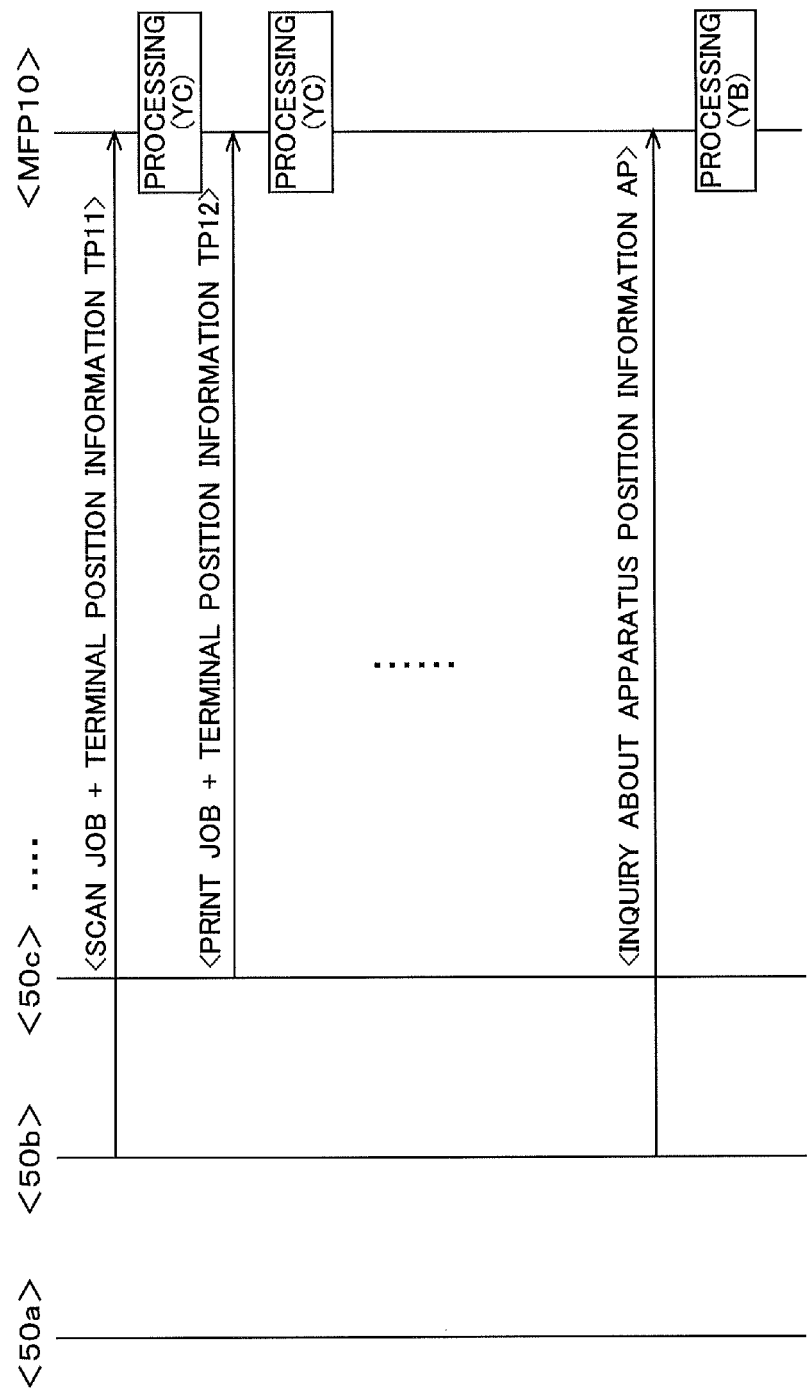
FIG. 8 is a view showing an operation of the image forming system in accordance with a second preferred embodiment.
Figure 9:
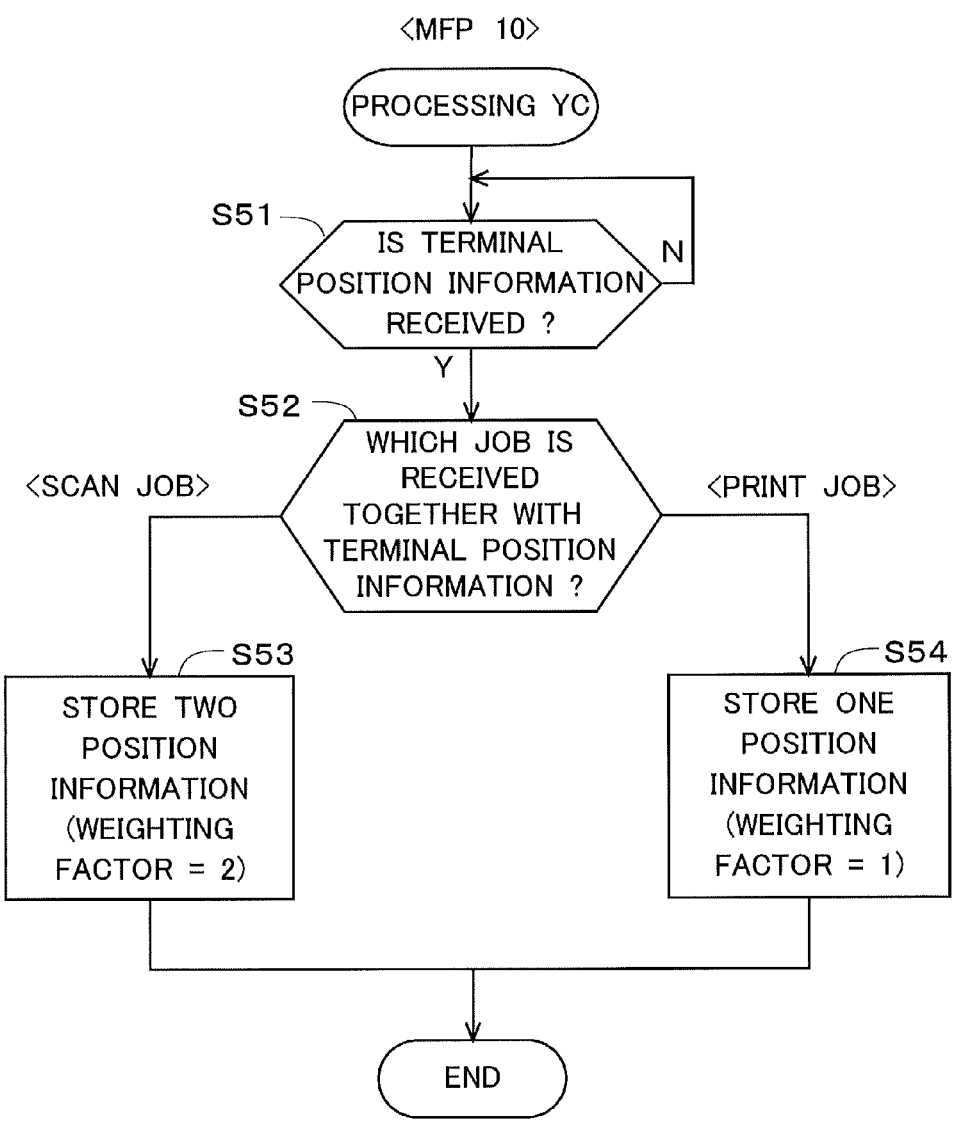
FIG. 9 is a flowchart showing an operation of the image forming apparatus.

Hereinafter, with reference to FIGS. 8 to 10, discussion will be made on an operation of the image forming system 1 in accordance with the second preferred embodiment. FIG. 8 is a view showing an outline of the operation of the image forming system 1. FIG. 9 is a flowchart showing an operation of the MFP 10. In more detail, FIG. 9 is a flowchart showing a processing YC (discussed later) performed by the MFP 10. FIG. 10 is a view showing a terminal position information table TB2 in accordance with the second preferred embodiment.

As shown in FIG. 8, when the MFP 10 receives the terminal position information TP (TP11, TP12, . . . ) from the external terminal 50, the MFP 10 performs the processing YC (discussed later) as appropriate. Further, when the MFP 10 receives the inquiry about the apparatus position information AP from the external terminal 50, the MFP 10 performs the processing YB (see FIG. 7) like in the first preferred embodiment.

Hereinafter, with reference to the flowchart of FIG. 9, discussion will be made on the processing YC.

When the MFP 10 receives the terminal position information TP from the external terminal 50 ("Yes" in Step S51), the MFP 10 performs a branch operation discussed below (Step S52).

Specifically, the MFP 10 determines whether the terminal position information TP is received together with the scan job or the print job, and then performs a branch operation on the basis of the determination result.

For example, when it is determined that the terminal position information TP11 is received from the external terminal 50b together with the scan job, the process goes to Step S53. Then, the image forming apparatus 10 uses the position information acquisition part 13 to record a terminal position PS11 (in more detail, coordinates of the terminal position) included in the terminal position information TP11 into the terminal position information table TB2 (see FIG. 10). Specifically, the position information acquisition part 13 records the terminal position PS11 twice (see FIG. 10) into the terminal position information table TB2 (in more detail, into lines 1 and 2 of the terminal position information table TB2) in cooperation with the storage part 5. The position information acquisition part 13 thereby indirectly sets a weighting factor of the terminal position PS11 to "2".

After that, when it is determined that the terminal position information TP12 is received from the external terminal 50c together with the print job, the process goes to Step S54. Then, the image forming apparatus 10 uses the position information acquisition part 13 to record a terminal position PS12 (in more detail, coordinates of the terminal position) included in the terminal position information TP12 into the terminal position information table TB2 (see FIG. 10). Specifically, the position information acquisition part 13 records the terminal position PS12 once (see FIG. 10) into the terminal position information table TB2 (in more detail, into line 3 of the terminal position information table TB2) in cooperation with the storage part 5. The position information acquisition part 13 thereby indirectly sets a weighting factor of the terminal position PS12 to "1".

Thus, the position information acquisition part 13 sets a different weight for the terminal position PS included in the terminal position information TP as appropriate depending on whether the terminal position information TP is received together with the scan job or the print job.

In more detail, the position information acquisition part 13 sets the weight of the terminal position PS11 included in the terminal position information TP11 which is received together with the scan job, to be larger than that of the terminal position PS12 included in the terminal position information TP12 which is received together with the print job.

In the above operation, the weighted average value of the plurality of terminal positions PS is calculated with the weight of the terminal position information TP11 which is received from the external terminal 50b together with the scan job set to be larger than the weight of the terminal position information TP12 which is received from the external terminal 50c together with the print job. In this case, when the scan job is executed, there is a strong likelihood that a user of the external terminal may be present near the MFP 10 in order to place an original manuscript or the like on the MFP 10. For this reason, there is a strong likelihood that the external terminal 50b may be also located near the MFP 10 when the scan job is executed. Accordingly, there is also a strong likelihood that the external terminal 50b which transmits the scan job may be located closer to the image forming apparatus than the external terminal 50c which transmits the print job. Therefore, it is possible to acquire more accurate apparatus position information AP as compared with a case where a simple average value of a plurality of terminal positions PS with no weight is acquired as the apparatus position information AP.

3. The Third Preferred Embodiment

The third preferred embodiment is a variation of the first preferred embodiment.

Discussion will be made below, centering on the difference between the first and third preferred embodiments.

In the third preferred embodiment, a case will be discussed where a different weight is set for the terminal position included in the terminal position information TP depending on whether the external terminal 50 which transmits the terminal position information TP and the MFP 10 are present within the same network or not.

Figure 11:
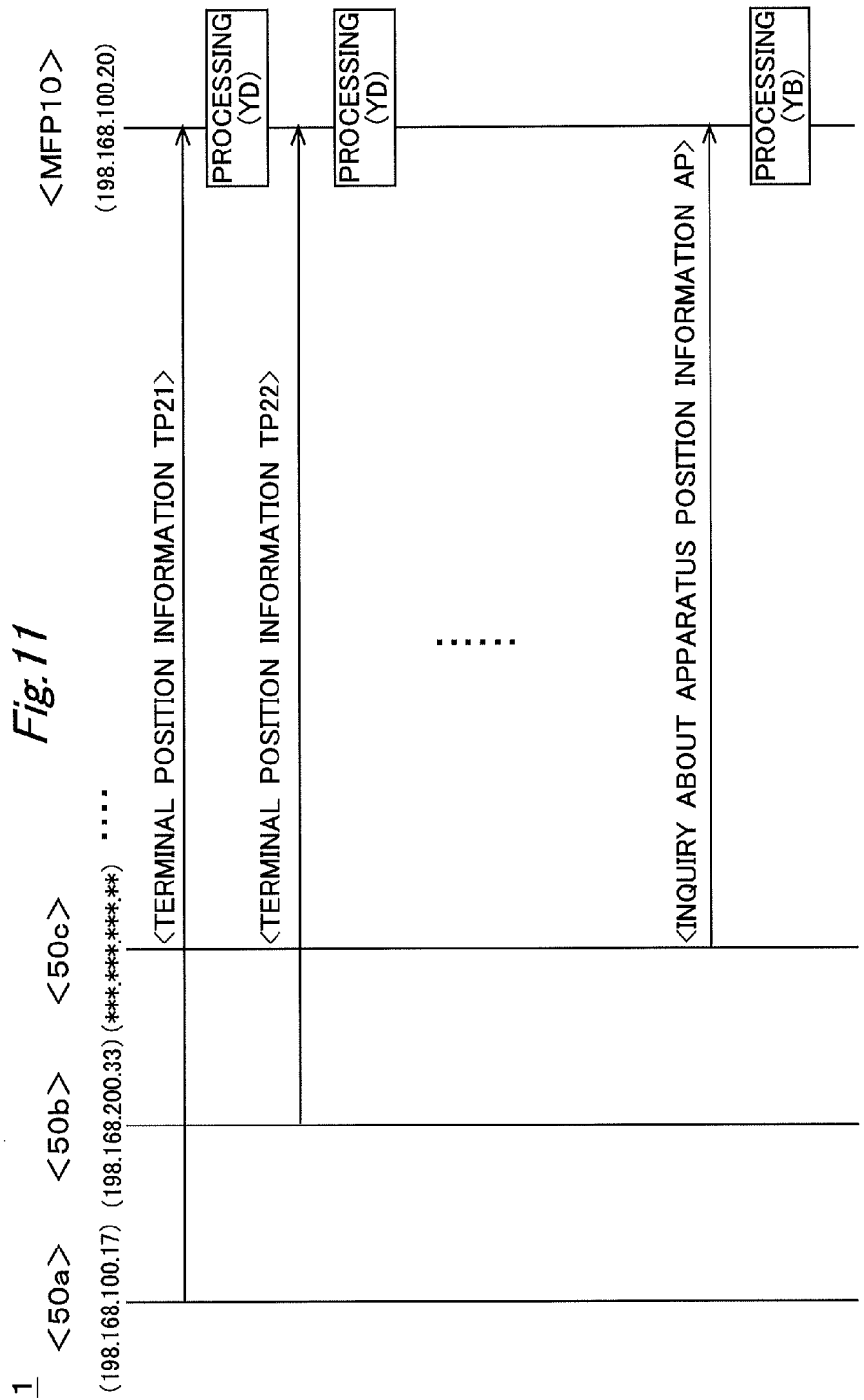
FIG. 11 is a view showing an operation of the image forming system in accordance with a third preferred embodiment.
Figure 12:
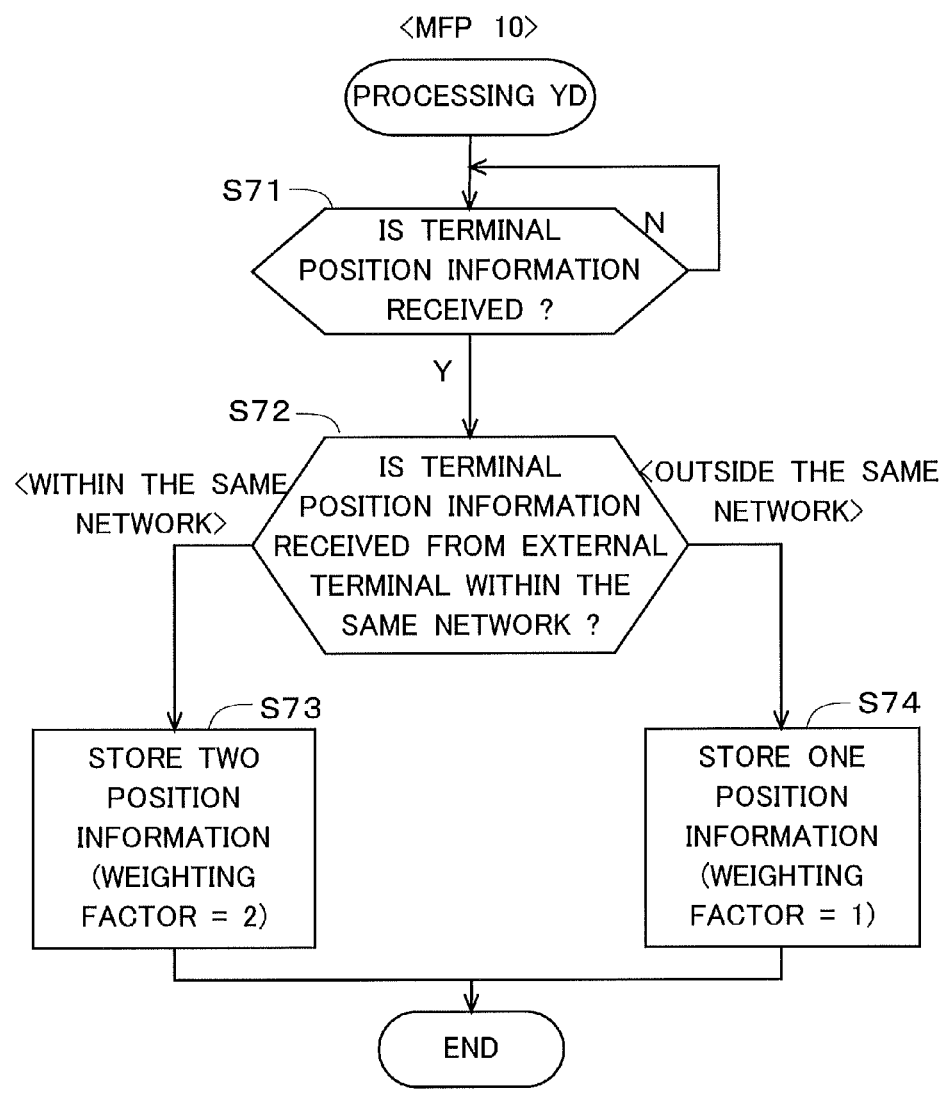
FIG. 12 is a flowchart showing an operation of the image forming apparatus.

Hereinafter, with reference to FIGS. 11 to 13, discussion will be made on an operation of the image forming system 1 in accordance with the third preferred embodiment. FIG. 11 is a view showing an outline of the operation of the image forming system 1. FIG. 12 is a flowchart showing an operation of the MFP 10. In more detail, FIG. 12 is a flowchart showing a processing YD (discussed later) performed by the MFP 10. FIG. 13 is a view showing a terminal position information table TB3 in accordance with the third preferred embodiment.

As shown in FIG. 11, when the MFP 10 receives the terminal position information TP (TP21, TP22, . . . ) from the external terminal 50, the MFP 10 performs the processing YD (discussed later) as appropriate. Further, when the MFP 10 receives the inquiry about the apparatus position information AP from the external terminal 50, the MFP 10 performs the processing YB (see FIG. 7) like in the above-discussed preferred embodiments.

Further, as shown in FIG. 11, in the third preferred embodiment, static IP addresses are set for the MFP 10 and the external terminals 50, respectively. Specifically, an IP address "198.168.100.20" is set for the MFP 10. Further, an IP address "198.168.100.17" is set for the external terminal 50a, and an IP address "198.168.100.33" is set for the external terminal 50b.

In this case, it is assumed that a subnet mask is "255.255.255.0" (high-order 24 bits are all "1"). At that time, the high-order 24 bits (from the first octet to the third octet) of an IP address (in more detail, a private IP address) of each host represent a network address part and the low-order 8 bits (the fourth octet) thereof represent a host address part. The network address part has a part for distinguishing a plurality of subnetworks from one another. For example, a static address (subnet address) is set for each of a plurality of subnetworks and the plurality of subnetworks are managed as different networks in a company. In most cases, a plurality of subnetwork addresses are assigned to areas, respectively, into which a physical space in the company is divided. Further, the host address part is used to identify each individual host in a subnetwork.

Hereinafter, with reference to the flowchart of FIG. 12, discussion will be made on the processing YD.

When the MFP 10 receives the terminal position information TP from the external terminal 50 ("Yes" in Step S71), the MFP 10 performs a branch operation discussed below (Step S72).

Specifically, the MFP 10 determines whether or not the external terminal 50 indicated by the terminal position information TP is present in the same network as the MFP 10, and then performs a branch operation on the basis of the determination result. In detail, the MFP 10 determines whether or not the external terminal 50 is present in the same network as the MFP 10, on the basis of coidentity between a network address part of an IP address of the external terminal 50 and a network address part of an IP address of the MFP 10.

In more detail, the MFP 10 determines that the external terminal 50 is present in the same network as the MFP 10 when the network address part of the IP address of the external terminal 50 is the same as the network address part of the IP address of the MFP 10. Then, the process goes to Step S73. On the other hand, when the network address part of the IP address of the external terminal 50 is different from the network address part of the IP address of the MFP 10, the MFP 10 determines that the external terminal 50 is not present in the same network as the MFP 10. Then, the process goes to Step S74.

When the terminal position information TP21 is received from the external terminal 50*a*, the MFP 10 determines whether or not the network address part (198.168.100) of the IP address of the external terminal 50*a* is the same as the network address part (198.168.100) of the IP address of the MFP 10. In this case, it is determined that the network address part of the IP address of the external terminal 50*a* is the same as the network address part of the IP address of the MFP 10, and the process goes to Step S73.

Then, the image forming apparatus 10 uses the position information acquisition part 13 to record a terminal position PS21 (in more detail, coordinates of the terminal position) included in the terminal position information TP21 transmitted from the external terminal 50*a* into the terminal position information table TB3 (see FIG. 13) (Step S73). Specifically, the position information acquisition part 13 records the terminal position PS21 twice (see FIG. 13) into the terminal position information table TB3 (in more detail, into lines 1 and 2 of the terminal position information table TB3) in cooperation with the storage part 5. The position information acquisition part 13 thereby indirectly sets a weighting factor of the terminal position PS21 to "2".

After that, when the terminal position information TP22 is received from the external terminal 50*b*, the MFP 10 determines whether or not the network address part (198.168.200) of the IP address of the external terminal 50*b* is the same as the network address part (198.168.100) of the IP address of the MFP 10. In this case, it is determined that the network address part of the IP address of the external terminal 50*b* is not the same as the network address part of the IP address of the MFP 10, and the process goes to Step S74.

Then, the image forming apparatus 10 uses the position information acquisition part 13 to record a terminal position PS22 (in more detail, coordinates of the terminal position) included in the terminal position information TP22 transmitted from the external terminal 50*b* into the terminal position information table TB3 (see FIG. 13) (Step S73). Specifically, the position information acquisition part 13 records the terminal position PS22 once (see FIG. 13) into the terminal position information table TB3 (in more detail, into line 3 of the terminal position information table TB3) in cooperation with the storage part 5. The position information acquisition part 13 thereby indirectly sets a weighting factor of the terminal position PS22 to "1".

Thus, the position information acquisition part 13 sets a different weight for the terminal position PS included in the terminal position information TP as appropriate depending on whether the external terminal 50 which transmits the terminal position information TP is present in the same network as the MFP 10.

Specifically, the position information acquisition part 13 sets the weight of the terminal position PS21 included in the terminal position information TP21 which is received by communication with the external terminal 50*a* which is present in the same network as the MFP 10, to be larger than that of the terminal position PS22 included in the terminal position information TP22 which is received by communication with the external terminal 50*b* which is not present in the same network as the MFP 10.

In the above operation, the weight of the terminal position information TP21 which is received by communication with the external terminal 50*a* which is determined to be present in the same network as the MFP 10 is set to be larger than the weight of the terminal position information TP22 which is received by communication with the external terminal 50*b* which is not determined to be present in the same network as the MFP 10. Then, the weighted average value of the plurality of terminal positions included in the plurality of terminal position information TP is calculated, and the weighted average value is acquired as the apparatus position information AP. In this case, there is a strong likelihood that the external terminal 50*a* which is present in the same network may be located closer to the MFP 10 than the external terminal 50*b* which is not present in the same network. Therefore, it is possible to acquire more accurate apparatus position information AP as compared with a case where a simple average value of a plurality of terminal positions PS with no weight is acquired as the apparatus position information AP.

4. Variations

Though the preferred embodiments of the present invention have been discussed above, the present invention is not limited to the above-discussed preferred embodiments.

For example, though the case has been discussed where the weighted average value of a plurality of terminal positions PS included in a plurality of terminal position information TP is acquired as the apparatus position information AP in the above-discussed preferred embodiments, this is only one exemplary case. The terminal position PS itself included in the terminal position information TP which is received by communication in accordance with the very-short-range wireless communication VR may be acquired as the apparatus position information AP.

As discussed above, the very-short-range wireless communication VR is a proximity communication mode in which communication can be performed only when the very-short-range wireless communication unit 54*a* of the external terminal 50 and the very-short-range wireless communication unit 4*a* of the MFP 10 are in a proximity state. In this case, there is a strong likelihood that the external terminal 50 which performs communication in accordance with the proximity communication mode may be located at substantially the same position as the MFP 10. For this reason, if the terminal position PS itself included in the terminal position information TP which is received by communication in accordance with the proximity communication mode is acquired as the apparatus position information AP, it is possible to acquire much more accurate apparatus position information AP.

Further, though the case has been discussed where the weighting factor of the terminal position PS is indirectly set in accordance with the number of records of the terminal position PS included in the terminal position information TP into the terminal position information table TB in the above-discussed preferred embodiments, this is only one exemplary case. For example, information used for setting the weighting factor of the terminal position PS may be recorded into the terminal position information table TB, together with the terminal positions PS included in the terminal position information TP.

Specifically, as a variation of the first preferred embodiment, when the terminal position information TP is recorded into the terminal position information table TB, information on which communication mode (which one of the very-short-range wireless communication VR, the short-range wireless communication SR, and the middle-range wireless communication MR) is used for the communication by which the terminal position information TP is received may be recorded together with the terminal position information TP. Then, in the calculation of the weighted average value of a plurality of terminal positions PS, the weighting factor ("3", "2", and "1") may be set in accordance with the communication mode (the very-short-range wireless communication VR, the short-range wireless communication SR, or middle-range wireless communication MR) recorded together with each terminal position.

Though the case has been discussed where the weighting factor of the terminal position information TP received by communication in accordance with the very-short-range wireless communication VR is set to "3", the weighting factor of the terminal position information TP received by communication in accordance with the short-range wireless communication SR is set to "2", and the weighting factor of the terminal position information TP received by communication in accordance with the middle-range wireless communication MR is set to "1" in the first preferred embodiment, this is only one exemplary case and the respective weighting factors may be set to values different from the above ones.

Similarly, the respective "weighting factors" set in the second and third preferred embodiments may be also set to values different from those in the above preferred embodiments.

Though the case has been discussed where the weighted average value of a plurality of terminal positions PS included in a plurality of terminal position information TP is acquired as the apparatus position information AP in the above-discussed preferred embodiments, this is only one exemplary case. For example, without setting any weights for the plurality of terminal positions PS, a simple average value of the plurality of terminal positions PS may be acquired as the apparatus position information AP.

Specifically, the terminal position PS included in the terminal position information TP which is received together with the print job or the like from the external terminal 50 may be simply recorded into the terminal position information table TB (without setting any weights). Then, the position information acquisition part 13 may acquire a simple average value of the plurality of terminal positions PS recorded in the terminal position information table TB, as the apparatus position information AP.

Though the case has been discussed where the MFP 10 receives the terminal position information TP from the external terminal 50 and acquires the apparatus position information AP on the basis of the terminal position information TP in the above-discussed preferred embodiments, this is only one exemplary case. For example, a print job server may receive the terminal position information TP together with the print job from the external terminal 50 and acquire the apparatus position information AP on the basis of the terminal position information TP. In this case, the terminal position information table TB is stored in the print job server, and when the terminal position information TP is received, the terminal position included in the terminal position information TP is recorded into the terminal position information table TB. Then, when the inquiry about the apparatus position information AP is received from the external terminal 50, the print job server may acquire an average value of the plurality of terminal positions PS recorded in the terminal position information table TB, as the apparatus position information AP.

Further, though the case has been discussed where the MFP 10 receives one terminal position information TP from each of a plurality of external terminals 50 in the above-discussed preferred embodiments, this is only one exemplary case. For example, the MFP 10 may receive a plurality of terminal position information TP from one external terminal 50. Particularly, the MFP 10 may receive a plurality of terminal position information from one external terminal 50 by communications in accordance with different communication modes. In more detail, the MFP 10 may receive terminal position information TP31 from the external terminal 50a by communication in accordance with the very-short-range wireless communication VR and also receive terminal position information TP32 from the same external terminal 50a by communication in accordance with the short-range wireless communication SR. In this case, the apparatus position information AP may be calculated by averaging the plurality of terminal positions included in the plurality of terminal position information with weights set in accordance with the communication modes, respectively.

While the invention has been shown and described in detail, the foregoing description is in all aspects illustrative and not restrictive. It is therefore understood that numerous modifications and variations can be devised without departing from the scope of the invention.

What is claimed is:

1. An image forming system comprising:
   an external terminal; and
   an image forming apparatus,
   wherein said external terminal has
   a position information detection part for detecting terminal position information which is position information of said external terminal; and
   a transmitting part capable of transmitting said terminal position information,
   said image forming apparatus has
   a communication part for receiving said terminal position information which is position information of said external terminal from said external terminal; and
   an acquisition part for acquiring apparatus position information which is position information of said image forming apparatus on the basis of said terminal position information,
   said communication part receives a plurality of terminal position information from at least one external terminal, and
   said acquisition part acquires a weighted average value of a plurality of terminal positions included in said plurality of terminal position information as said apparatus position information by calculating the weighted average with a weight of one of said terminal position information set to be larger than others, wherein one of the following three conditions applies:
(A) said plurality of terminal position information include first terminal position information received from a first external terminal by communication in accordance with a first communication mode and second terminal position information received from a second external terminal or said first external terminal by communication in accordance with a second communication mode having a maximum communication distance longer than that of said first communication mode, and said acquisition part calculates the weighted average value of said plurality of terminal positions with a weight of said first terminal position information set to be larger than that of said second terminal position information and acquires said weighted average value as said apparatus position information;
(B) said plurality of terminal position information include first terminal position information received from a first external terminal together with a scan job and second terminal position information received from a second external terminal or said first external terminal together with a print job, and said acquisition part calculates the weighted average value of said plurality of terminal positions with a weight of said first terminal position information set to be larger than that of said second terminal position information and acquires said weighted average value as said apparatus position information; and
(C) said at least one external terminal includes a plurality of external terminals,
said image forming apparatus further having a determination part for determining whether each of said plurality of external terminals is present in the same network or not on the basis of coidentity between a network address part of an IP address of each of said plurality of external terminals and a network address part of an IP address of said image forming apparatus, wherein said plurality of terminal position information include first terminal position information received by communication with a first external terminal which is determined to be present in the same network as said image forming apparatus and second terminal position information received by communication with a second external terminal which is not determined to be present in the same network as said image forming apparatus, and said acquisition part acquires the weighted average value of said plurality of terminal positions as said apparatus position information with a weight of said first terminal position information set to be larger than that of said second terminal position information.

2. The image forming system according to claim 1, wherein condition A applies.

3. The image forming system according to claim 2, wherein said first communication mode is a proximity communication mode in which communication can be performed only when a transmitting unit and a receiving unit are in a proximity state of about 10 cm or less.

4. The image forming system according to claim 2, wherein said first communication mode and said second communication mode are each a non-proximal communication mode in which communication can be performed even when a transmitting unit and a receiving unit are in a non-proximity state.

5. The image forming system according to claim 4, wherein said first communication mode includes short-range wireless communication, and said second communication mode includes communication via wireless LAN.

6. The image forming system according to claim 1, wherein condition B applies.

7. The image forming system according to claim 1, wherein condition C applies.

8. The image forming system according to claim 1, wherein said acquisition part acquires said apparatus position information in response to an inquiry about said apparatus position information transmitted from said external terminal, and
said communication part transmits said apparatus position information acquired by said acquisition part to said external terminal.

9. An image forming apparatus comprising:
a communication part for receiving terminal position information which is position information of an external terminal from said external terminal; and
an acquisition part for acquiring apparatus position information which is position information of said image forming apparatus on the basis of said terminal position information,
wherein said communication part receives a plurality of terminal position information from at least one external terminal, and
said acquisition part acquires a weighted average value of a plurality of terminal positions included in said plurality of terminal position information as said apparatus position information by calculating the weighted average with a weight of one of said terminal position information set to be larger than others,
wherein one of the following three conditions applies:
(A) said plurality of terminal position information include first terminal position information received from a first external terminal by communication in accordance with a first communication mode and second terminal position information received from a second external terminal or said first external terminal by communication in accordance with a second communication mode having a maximum communication distance longer than that of said first communication mode, and said acquisition part calculates the weighted average value of said plurality of terminal positions with a weight of said first terminal position information set to be larger than that of said second terminal position information and acquires said weighted average value as said apparatus position information;
(B) said plurality of terminal position information include first terminal position information received from a first external terminal together with a scan job and second terminal position information received from a second external terminal or said first external terminal together with a print job, and said acquisition part calculates the weighted average value of said plurality of terminal positions with a weight of said first terminal position information set to be larger than that of said second terminal position information and acquires said weighted average value as said apparatus position information; and
(C) said at least one external terminal includes a plurality of external terminals,
said image forming apparatus further having a determination part for determining whether each of said plurality of external terminals is present in the same network or not on the basis of coidentity between a network address part of an IP address of each of said plurality of external terminals and a network address part of an IP address of said image forming apparatus, wherein said plurality of terminal position information include first terminal position information received by communication with a first external terminal which is determined to be present in the same network as said image forming apparatus and second terminal position information received by communication with a second external terminal which is not determined to be present in the same network as said image forming apparatus, and said acquisition part acquires the weighted average value of said plurality of terminal positions as said apparatus position information with a weight of said first terminal position information set to be larger than that of said second terminal position information.

10. The image forming apparatus according to claim 9, wherein condition A applies.

11. The image forming apparatus according to claim 10, wherein
said first communication mode is a proximity communication mode in which communication can be performed only when a transmitting unit and a receiving unit are in a proximity state of about 10 cm or less.

12. The image forming apparatus according to claim 10, wherein
said first communication mode and said second communication mode are each a non-proximal communication mode in which communication can be performed even when a transmitting unit and a receiving unit are in a non-proximity state.

13. The image forming apparatus according to claim 12, wherein
said first communication mode includes short-range wireless communication, and
said second communication mode includes communication via wireless LAN.

14. The image forming apparatus according to claim 9, wherein condition B applies.

15. The image forming apparatus according to claim 9, wherein condition C applies.

16. The image forming apparatus according to claim 9, wherein
said acquisition part acquires said apparatus position information in response to an inquiry about said apparatus position information transmitted from said external terminal, and
said communication part transmits said apparatus position information acquired by said acquisition part to said external terminal.

17. A non-transitory computer-readable recording medium for recording therein a computer program to be executed by a computer embedded in an image forming apparatus to cause said computer to perform the steps of:
a) receiving terminal position information which is position information of an external terminal from said external terminal; and
b) acquiring apparatus position information which is position information of said image forming apparatus on the basis of said terminal position information,
wherein a plurality of terminal position information are received from at least one external terminal in said step a), and
a weighted average value of a plurality of terminal positions included in said plurality of terminal position information is acquired as said apparatus position information in said step b) by calculating the weighted average with a weight of one of said terminal position information set to be larger than others,
wherein one of the following three conditions applies:
(A) said plurality of terminal position information include first terminal position information received from a first external terminal by communication in accordance with a first communication mode and second terminal position information received from a second external terminal or said first external terminal by communication in accordance with a second communication mode having a maximum communication distance longer than that of said first communication mode, and said acquisition part calculates the weighted average value of said plurality of terminal positions with a weight of said first terminal position information set to be larger than that of said second terminal position information and acquires said weighted average value as said apparatus position information;
(B) said plurality of terminal position information include first terminal position information received from a first external terminal together with a scan job and second terminal position information received from a second external terminal or said first external terminal together with a print job, and said acquisition part calculates the weighted average value of said plurality of terminal positions with a weight of said first terminal position information set to be larger than that of said second terminal position information and acquires said weighted average value as said apparatus position information; and
(C) said at least one external terminal includes a plurality of external terminals,
said image forming apparatus further having a determination part for determining whether each of said plurality of external terminals is present in the same network or not on the basis of coidentity between a network address part of an IP address of each of said plurality of external terminals and a network address part of an IP address of said image forming apparatus, wherein said plurality of terminal position information include first terminal position information received by communication with a first external terminal which is determined to be present in the same network as said image forming apparatus and second terminal position information received by communication with a second external terminal which is not determined to be present in the same network as said image forming apparatus, and said acquisition part acquires the weighted average value of said plurality of terminal positions as said apparatus position information with a weight of said first terminal position information set to be larger than that of said second terminal position information.

* * * * *